United States Patent [19]
Butler et al.

[11] Patent Number: 5,280,616
[45] Date of Patent: Jan. 18, 1994

[54] LOGIC CIRCUIT FOR TASK PROCESSING

[75] Inventors: Nicholas D. Butler, Romsey; Malcolm D. Buttimer, Salisbury; Brian C. Homewood, Winchester, all of England; Steven P. Larky, Austin, Tex.; Roderick M. West, Chandlers Ford, England; Paolo G. Sidoli, Bardi, Italy

[73] Assignee: International Business Machines Corporation, Armonk, N.Y.

[21] Appl. No.: 890,330

[22] Filed: May 26, 1992

Related U.S. Application Data

[63] Continuation of Ser. No. 485,339, Feb. 26, 1990, abandoned.

[30] Foreign Application Priority Data

Feb. 27, 1989 [GB] United Kingdom ............... 8904412

[51] Int. Cl.⁵ .................... G06F 1/06; G06F 11/00
[52] U.S. Cl. ................. 395/650; 371/22.3; 395/725; 364/977.5; 364/DIG. 2
[58] Field of Search ............ 395/650, 725, 775; 371/22.3, 14, 12, 13, 61, 66; 364/977.5, DIG. 2

[56] References Cited

U.S. PATENT DOCUMENTS

| | | | |
|---|---|---|---|
| 4,504,784 | 3/1985 | Goel et al. | 371/22.3 |
| 4,697,267 | 9/1987 | Wakai | 371/22.3 |
| 4,710,933 | 12/1987 | Powell et al. | 371/22.3 |
| 4,802,116 | 1/1989 | Ward et al. | 364/900 |

Primary Examiner—Michael R. Fleming
Assistant Examiner—Glenn A. Auve
Attorney, Agent, or Firm—Mark S. Walker; William A. Kinnman, Jr.

[57] ABSTRACT

In a logic circuit having clocked state latches and combinatorial logic for functional processing of a task in response to functional clocking of the state latches, the state latches are additionally interconnected to form a scannable chain of latches, and task switching logic is provided for suspending task processing by interrupting the functional clocking of the state latches and, during such suspension, scanning the state latches such that existing contents of the state latches defining a task state can be saved from the state latches or new contents defining a task state can be loaded into the state latches. The invention provides an efficient means for switching tasks being performed by a logic circuit in a multiprocessing enviornment.

19 Claims, 9 Drawing Sheets

LOGIC CIRCUIT FOR TASK PROCESSING

CROSS-REFERENCE TO RELATED APPLICATION

This application is a continuation of application Ser. No. 07/485,339, filed Feb. 26, 1990 now abandoned.

BACKGROUND OF THE INVENTION

1. Field of the Invention

This invention relates to a logic circuit for task processing in a multitasking environment and to a method of operating such a circuit.

2. Description of the Related Art

Multitasking is a concept which has been known for a long time in connection with mainframe computer systems. In recent years multitasking personal computers have also been marketed. Essential to the concept of a multitasking system is a mechanism which enables the current state of a physical processor performing a task to be saved in a manner which enables it to be restored at a later time and to set up the processor with a previously saved or defined state for performing a new task. Conventionally this has been done by a set of procedures storing the contents of all the critical processor registers on saving a task and then reinstating the stored values in the processor registers when restoring the task at a later time.

As a result of the continued trend towards multitasking systems, there has developed a need to enable tasks being performed by coprocessors or coprocessing logic associated with a main processor for performing a particular set of processes (e.g., I/O processing) to be saved or restored in order that the coprocessor or coprocessing logic can operate in a multitasking mode. The difficulty is that this logic may be very complicated indeed and may contain many hundreds of values which need to be saved in order to preserve the state information.

An object of the present invention is therefore to provide a mechanism whereby task switching may be reliably and efficiently performed, even for complex logic circuits.

SUMMARY OF THE INVENTION

In accordance with a first aspect of the invention there is provided a logic circuit for task processing in a multitasking environment, the logic circuit comprising a plurality of clocked state latches and combinatorial logic for functional processing of a task, the content of the state latches defining the current state of the task, the task being processed by the combinatorial logic in response to functional clocking of the state latches, the state latches being additionally interconnected to form at least one scannable chain of latches, and task switching means which, in response to a receipt of a task switch command during functional processing, temporarily interrupts the functional clocking of the state latches, whereby functional task processing is temporarily suspended, and, during said suspension, causes the state latches of each scan chain to be scanned, whereby existing contents of the state latches defining a task state can be saved from the state latches or new contents defining a task state can be loaded into the state latches.

A logic circuit in accordance with the invention provides a very efficient mechanism for switching the task being performed by the circuit. The approach adopted by the invention is much more efficient, in terms of silicon area and general circuit complexity, than making every register in a design externally addressable and thus readable and writable by conventional logic paths using multiplexers.

Particularly in the case where the logic circuit is an integrated logic circuit, it is preferable that a data path for loading data into a state latch or a plurality of adjacent state latches at a first position in each chain and a data path for reading data from a state latch or a plurality of adjacent state latches at a second position in each chain be provided, wherein at least one of said first and second positions is intermediate the length of the chains. In this way, additional clocked latches may be incorporated in parts of the circuit which are used for controlling task switching and which do not define the functional state of a processor during functional processing of a task. These additional latches may then be used for testing the circuit during circuit manufacture, but their contents are not saved or restored during task switching. In such a case the task switching means need not interrupt the functional clocking of the additional clocked latches in response to receipt of a task switch command during functional processing, so that only data for the state latches at and between said first and second positions are saved therefrom or loaded therein.

The logic circuit can include a clock generator for generating functional clocks for functional clocking of said latches and for generating a scan clock for scanning the state latches. For scanning the state latches during a temporary suspension of functional task processing, the task switching means can then cause the scan clock to be applied to said state latches to scan each scan chain.

Where there are a plurality of scan chains of latches, each chain preferably contains the same number of state latches between the first and second positions, as this simplifies the control of the scanning and processing of task data.

A feedback path for selectively loading data from the second position in each scan chain into a state latch at the first position in that scan chain can be provided such that an existing task may be restored as its task state data is saved. Such a feedback path enables debugging of functional software used during functional processing by interrupting the functional processing, saving the content of the state latches, restoring content of the state latches and then resuming functional processing.

In a particular example of the invention to be described later, the logic circuit is in the form of an integrated processor for processing data wherein the task switching means comprises control circuitry, wherein functional data processing is performed by processor circuitry and wherein said scan chains extend through both said control logic and said processor circuitry with said first and second positions corresponding, respectively, to the first and last of said state latches of the scan chains in the processing circuitry.

The invention is particularly advantageous in the case of a logic circuit designed in accordance with the Level Sensitive Scan Design (LSSD) philosophy, as a task switching mechanism can be achieved with minimal additional circuitry by modifying the LSSD scan chains inherent in such a circuit.

In accordance with a second aspect of the invention, there is provided, in a data processing system comprising a system processor, system memory and a logic circuit as above, a method of saving a task being performed by said logic circuit in response to receipt of a task save instruction from the system processor, the method comprising the steps of:
a) interrupting the functional clocking of said state latches;
b) reading data from each scan chain at a state latch or a plurality of adjacent state latches at the end of a sequence of said latches in which data defining the functional state of the task is latched and saving said data in said system memory;
c) controlling the state latches to cause data to be scanned along each scan chain by a number of latch positions equal to the number of state latches per scan chain from which data is read in step (b); and
d) repeating steps (b) and (c) until the contents of all of the state latches in said sequence of latches have been saved in said system memory.

In accordance with a third aspect of the invention, there is provided in a data processing system comprising a system processor, system memory and a logic circuit as above, a method of loading a predefined or previously saved task to be performed by said logic circuit in response to receipt of a task restore instruction from the system processor, the method comprising the steps of:
a) interrupting the functional clocking of said state latches;
b) loading data for defining the functional state of the task from system memory into each scan chain at a state latch or a plurality of adjacent state latches at the beginning of a sequence of said latches in which data defining said functional state is to be latched;
c) controlling the state latches to cause data to be scanned along each scan chain by a number of latch positions equal to the number of latches per scan chain into which data is loaded in step (b);
d) repeating steps (b) and (c) until all of the state latches in said sequence of latches have been loaded with said data from said system memory; and then
e) restoring functional clocking of the state latches.

A task save and restore operation may be performed in a data processing system comprising a system processor, system memory and a logic circuit as above by:
i) initially performing the method for saving a task as above; and
ii) subsequently performing steps (b) and (e) of the method for restoring the predefined or previously saved task as above.

Alternatively, the individual steps of a method of saving a first task being performed by the logic circuit and restoring a previously saved or the same task to be performed by said logic circuit in response to receipt of a task save-and-restore or debug instruction from the system processor can be interleaved.

DESCRIPTION OF THE PREFERRED EMBODIMENTS

In the following a particular example of a logic circuit in accordance with the invention is described. This particular example is in the form of a processor designed in accordance with Level Sensitive Scan Design (LSSD) technology.

LSSD Technology—An Overview

LSSD is a design technology which has been known for many years and is employed to enable testing of complex circuits. The essence of LSSD is to break the combinatorial logic in a complex circuit into sections and to link the sections by state latches. These state latches are chained together to provide scan chains which have conventionally been used for circuit testing during manufacture.

Figure 1:
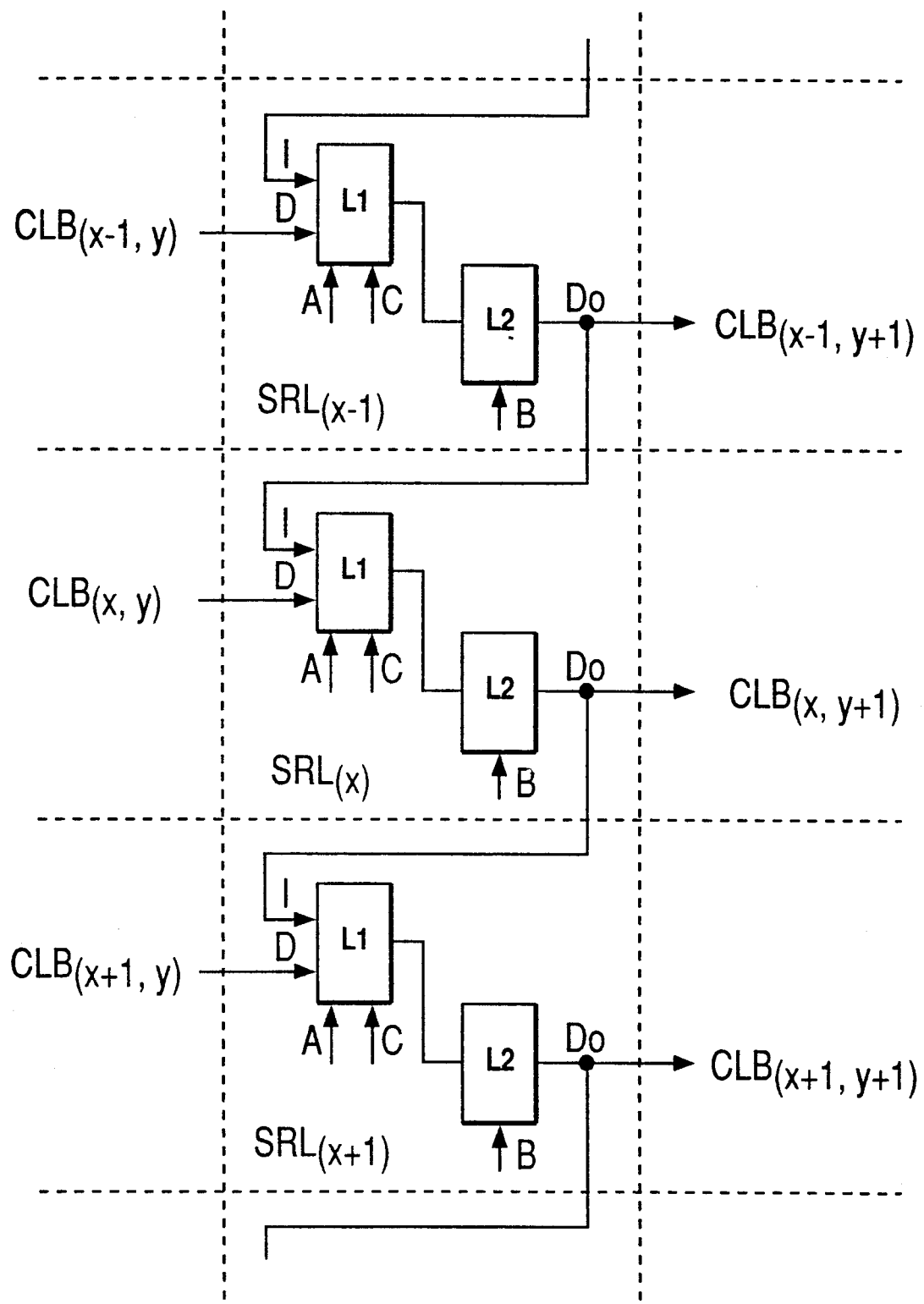
FIG. 1 is a schematic illustration of a shift register latch stage for an LSSD logic circuit.

FIG. 1 is a schematic block diagram of three Shift Register Latch (SRL) stages $SRL(x-1)$, $SRL(x)$, $SRL(x+1)$ in a scan chain. An LSSD scan chain is formed by a chain of such SRLs with the input of the first SRL being a primary input of the circuit and the output of the last SRL being a primary output of the circuit. All SRLs other than the first take their scan inputs from the preceding SRLs in a chain. All SRLs other than the last provide inputs for all subsequent SRLs in the chain. Also shown are combinatorial logic blocks $CLB(x-1,y)$, $CLB(x,y)$, $CLB(x+1,y)$, $CLB(x-1,y+1)$, $CLB(x,y+1)$, $CLB(x+1,y+1)$.

An LSSD SRL consists of two latches, L1 and L2, each capable of storing a single bit of data when the clocks are at a low level. The first latch, L1, has two data inputs, D and I, and two clock inputs C and A. The clock inputs may be derived directly from clock outputs of a clock generator or alternatively gated by other functional signals determined by the operating conditions for loading an SRL. When clock C is at a high, or active, level, the content of latch L1 takes on the value of data input D. When clock A is at a high, or active, level, the content of latch L1 takes on the value of data input I, which the first latch L1 of SRL(x) receives at its data input I from output of the L2 latch of the SRL (SRL(x−1)) preceding it in the scan chain. On receipt of a positive clock pulse at clock input A, latch L1 of SRL(x) takes on the value of latch L2 of SRL(x−1), which is transferred to latch L2 of SRL(x) on receipt of a subsequent positive clock pulse at clock input B. It is a requirement of LSSD that clocks C and A are never active at the same time. The second latch, L2, has a single clock input, B, and takes its data input directly and internally from the first latch L1. When clock B is at a high active level, the content of latch L2 takes on the value stored in latch L1. The content of latch L2 is made available at output Do.

In a conventional LSSD logic circuit the A clock is only needed for testing the circuit during manufacture. The A clock is hardwired to a primary input of the device and is driven by test apparatus during manufacturing for device testing. The effect of the A clock in combination with the B clock is to scan the LSSD chain. In the scan clocking mode, the first latch L1 of SRL(x) receives its input data from the output of the L2 latch of the SRL (SRL(x−1)) preceding it in the scan chain. On receipt of a positive clock pulse at clock input A, the L1 latch of SRL(x) takes on the value of the L2 latch of the preceding SRL (SRL(x−1)), which value is transferred to the corresponding latch L2 of SRL(x) on receipt of a subsequent positive clock pulse at clock input B.

The SRLs also play a role during functional processing of a task. When one or more SRLs behave functionally as a single entity, that entity is referred to as a register. In functional clocking, the SRL receives a series of positive clock pulses alternately to the C clock input and the B clock input, so that the value on data input D is loaded into L1 and thence into L2. During functional processing of a task, the operating state of the circuit is recorded at any point in time by the data in the register. Although the SRLs consituting the register play a role in functional processing, the scan chains as such are not utilized in functional processing.

Example of a Logic Circuit in Accordance with the Invention

In this example of the invention, which is based on an LSSD logic circuit, the functional state of that circuit is uniquely defined at any one time by the content of the SRLs contained therein. The invention makes use of the LSSD scan chains, which would conventionally serve no purpose after testing the circuit during manufacture, as the basis for a task switching mechanism. The functional state of the processor can change every processor clock cycle, the state being a function of the previous state and the primary inputs to the circuit. By modifying the control of the SRLs of at least part of the scan chains, so that at least part of the scan chains may be used for shifting functional data (as opposed to test data) out of and into those SRLs, the state of the circuit can be saved at any time and then restarted, or restored, at some later time. In this way any task can be temporarily suspended and later restarted. Also, a predetermined or previously saved state of the circuit can be loaded in place of the current state, whereby the circuit can be made to perform an entirely new task. In this manner, a circuit can be switched between different tasks in a controlled way.

Figure 2:
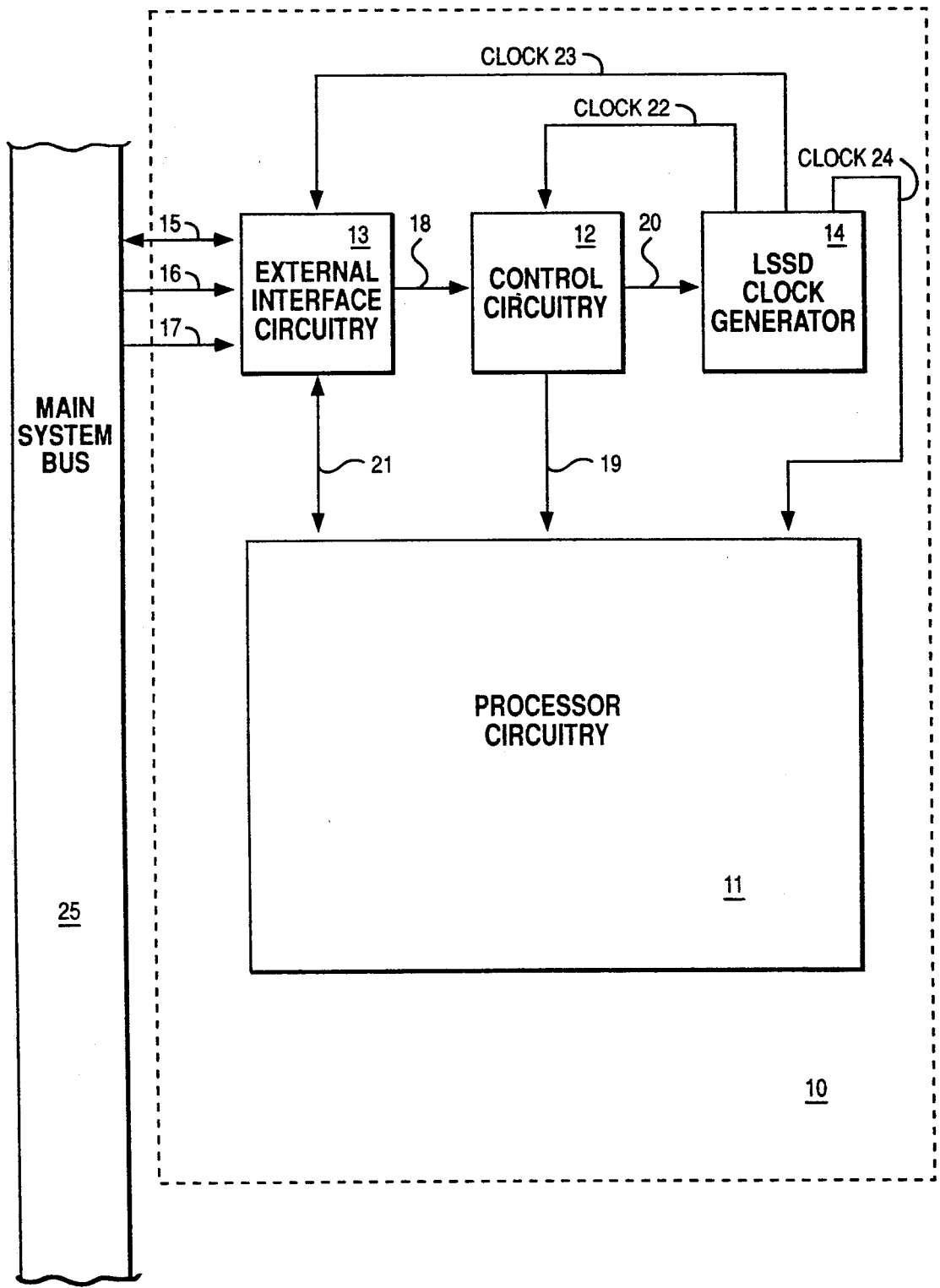
FIG. 2 is a schematic block diagram of an embodiment of the invention in the form of an LSSD processor.

FIG. 2 is a schematic block diagram of a processor 10 designed with LSSD technology. The processor 10 includes processor circuitry 11, control circuitry 12, external interface circuitry 13 and an LSSD clock generator 14. The processor 10 illustrated is a coprocessor which is connected to a main system bus 25. Also connected to the bus 25, but not shown, are assumed to be a main system processor, system memory, read only memory, adapters for background storage, a keyboard and so on.

The processor circuitry 11 is the computational engine of the processor; it performs the tasks being executed by the processor 10. The control circuitry 12 controls the mode in which the processor 10 is operating. It can respond to instructions received from the system bus 25 via the external interface circuitry 13 over instruction lines 16 and 18. The control circuitry 12 is connected to provide control information to the processor circuitry 11 via control lines 19 to cause, for example, the processor circuitry to stop or start. It is connected via control lines 20 to control the operation of the LSSD clock generator 14. The external interface circuitry 13 controls the communication of the processor 10 with external devices. As illustrated, it controls the flow of data into and out of the processor via data lines 15; it is also connected to the bus 25 via control lines 17. The external interface circuitry 13 is connected to the processor circuitry 11 by a bidirectional bus 21. The external interface circuitry 13 can also be used to connect the processor 10 to other external devices. For example, if the processor 10 forms part of a display adapter, the external interface circuitry can connect the processor to other devices (not shown) in the display adapter or in a display subsystem. The LSSD clock generator 14 provides all the LSSD clocks via CLOCK lines 22–24 to the circuitry 11, 12 and 13 in the processor 10. The LSSD clock generator 14 can take its primary clock frequencies from an internal clock source or from an external clock source (not shown) in a conventional manner.

Figure 3:
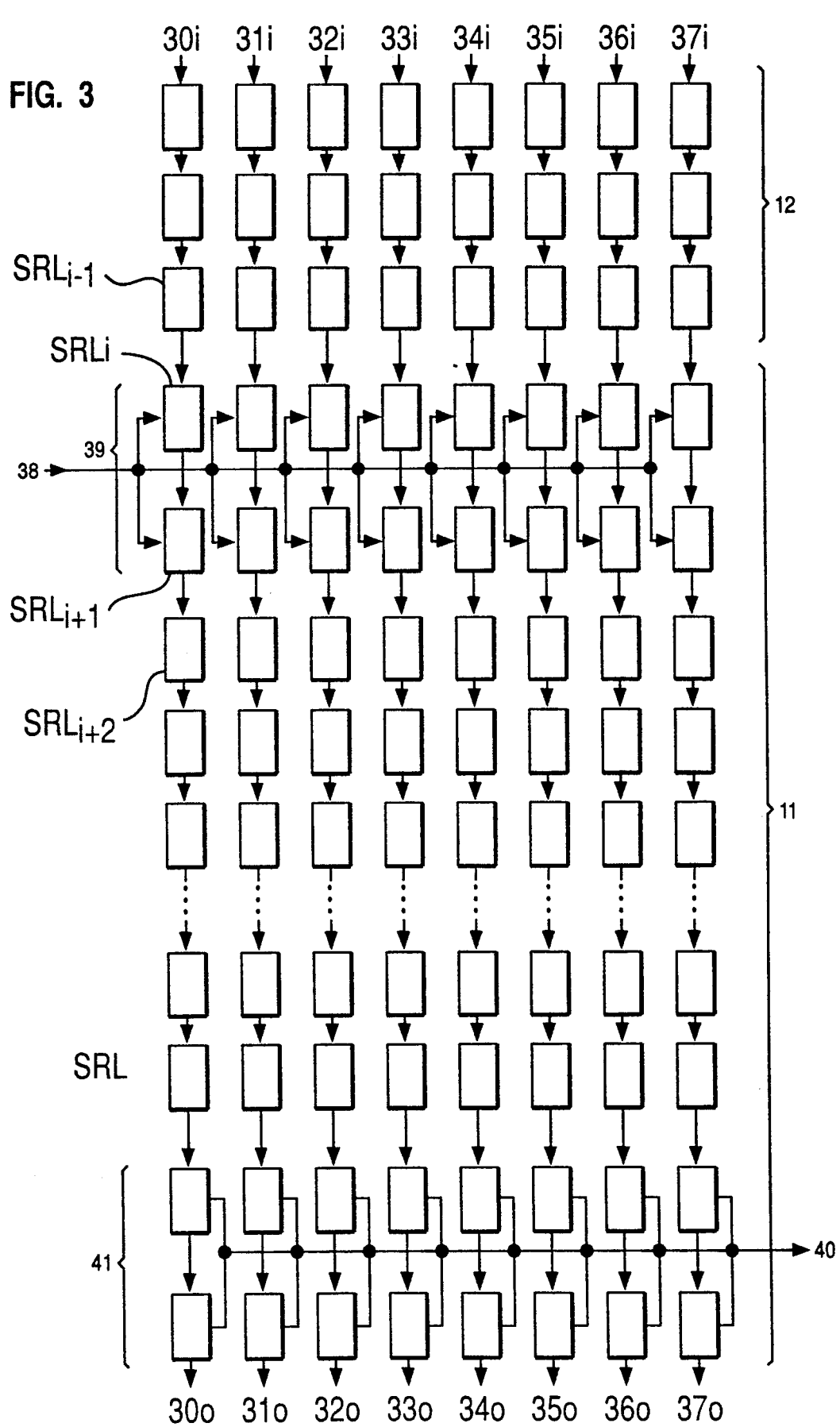
FIG. 3 is a schematic representation of the scan chains of the LSSD processor of FIG. 2.

FIG. 3 is a schematic block diagram of the scan chains 30–37 which are formed by directly linking together the SRLs of the processor 10. In this case there are eight scan chains, which begin at primary inputs 30i–37i (Scan Inputs) and end at primary outputs 30o–37o (Scan Outputs). As indicated in FIG. 3, the scan chains extend through the control circuitry 12 and the processor circuitry 11. The scan chains do not, in this example, extend through the external interface circuitry 13, although this would also be possible if required for circuit testing during manufacturing. For conventional circuit testing the complete scan chains will be scanned.

Task switching is achieved in this example of the invention by scanning only that part of the scan chains which includes the SRLs in the processor circuitry 11. It is the SRLs of the processor circuitry 11 that define the state of the task being performed. The SRLs in the control circuitry 12 should not be scanned, as this part controls the processor's operation. Similarly, if the scan chains extend into the external interface circuitry 13, SRLs in this circuitry should not be scanned, as the interface circuitry 13 is used for inputting and outputting information from the processor 10.

In order to enable only the part of the scan chains in the processor circuitry 11 to be scanned, an input data path 38 is provided into the first regular latches 39 of the scan chains in the processing circuitry 11 and an output data path 40 is similarly provided from the last register latches 41 of the scan chains in the processing circuitry 11 for inputting data to and outputting data from the scan chains. The input and output data paths are connected via the external interface circuitry 13 to the data lines 15 of the bus 25. It is preferable that each of the scan chains 30–37 in the processor circuitry 11 contain the same number of SRLs. Unequal numbers of SRLs can be handled, but the processing of task data and the scanning and processing of the SRLs is made more complex.

Figure 4:
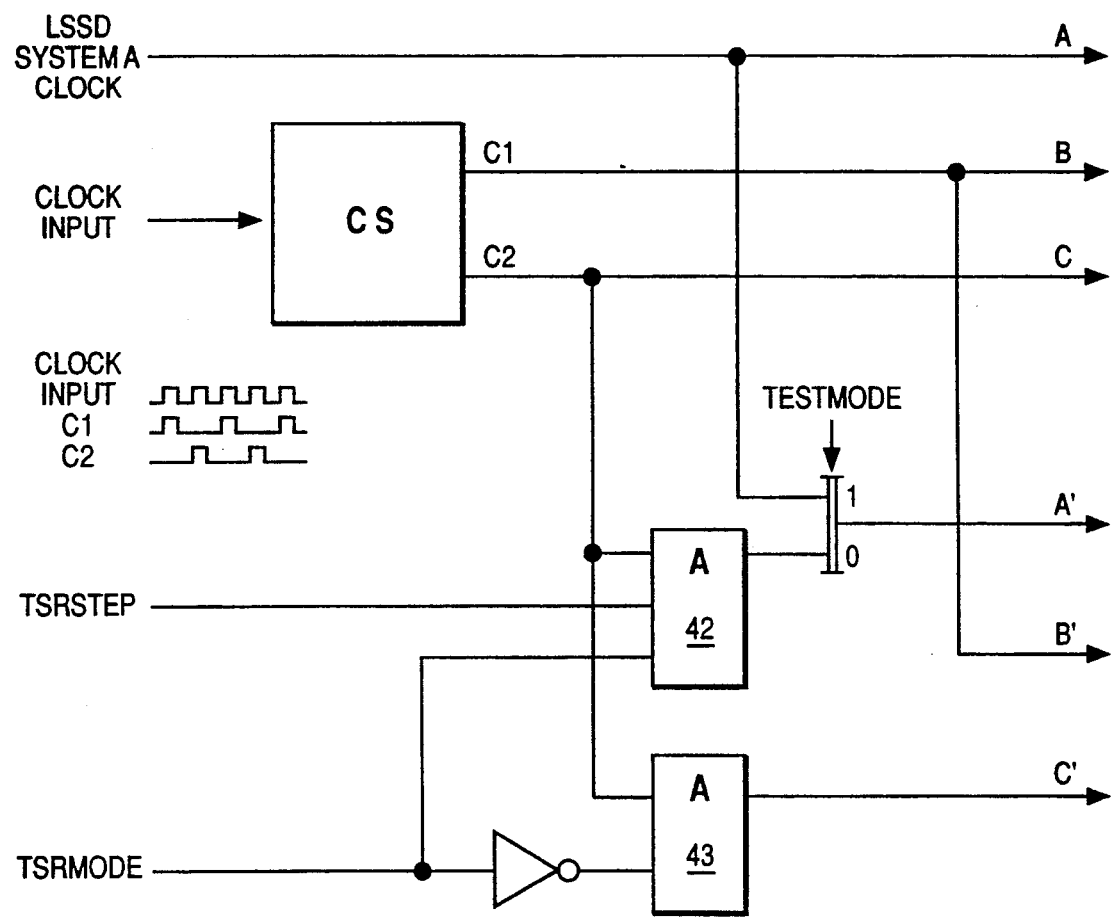
FIG. 4 is a schematic representation of part of the clock generator of the LSSD processor of FIG. 2.

FIG. 4 illustrates part of the clock generator 14 in the logic circuit illustrated in FIG. 2. In response to a primary clock input (CLOCK INPUT) a clock splitter CS produces two clock trains C1 and C2 which are used to provide the conventional LSSD B and C clocks. FIG. 4 also illustrates a line showing the LSSD System A clock. It can be seen that this clock is not generated from the CLOCK INPUT and during normal operation of the circuit (i.e., after testing during manufacture) the LSSD system A clock will be inactive.

In a conventional LSSD logic circuit the A, B and C clocks would be supplied to all the SRLs in the logic circuit. In the present example of a logic circuit in accordance with the invention, however, AND gates 42 and 43 are provided for supplying modified clocks signals A', B' and C' to SRLs in accordance with control signals TSRSTEP and TSRMODE generated by the control circuitry 12. A multiplexer switch receiving the TESTMODE signal is used during circuit manufacture for device testing to allow the LSSD system A clock to be applied to the SRLs of the processor circuitry. In normal usage of the circuit the TESTMODE signal is inactive so that the output from the AND gate 42 is used to generate the A' clock.

Figure 5:
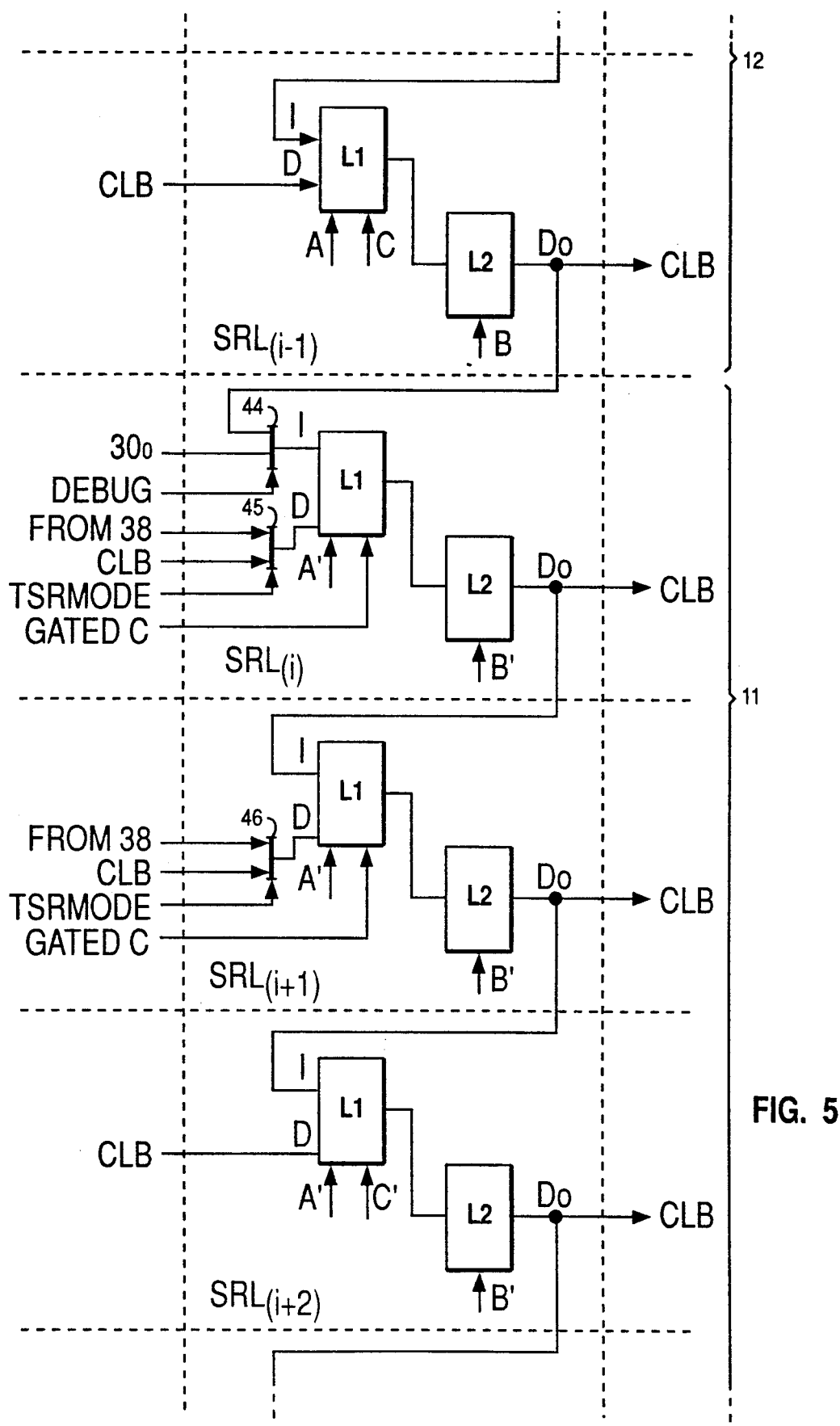
FIG. 5 is a schematic block diagram of part of a scan chain of FIG. 3.

FIG. 5 illustrates four latch register stages SRL(i−1), SRL(i), SRL(i+1) and SRL(i+2) in the first scan chain 30 of FIG. 3. SRL(i−1) is outside the processor circuitry 11, whereas the latter three SRLs are inside it. The data inputs of SRL(i) and SRL(i+1) are connected via multiplexer switches 45 and 46 to respective lines in the data path 38 to enable new task state data to be loaded into those registers when a TSRMODE signal is active. The scan clock input of SRL(i−1) is connected to receive the LSSD system A clock. The scan clock inputs of SRL(i), SRL(i+1) and SRL(i+2) are connected to reveive the A' clock. The functional clock input of SRL(i−1) is connected to receive the C clock directly. The functional clock inputs of SRL(i) and SRL(i+1) are connected to receive the C clock, but gated by gating circuitry (not shown) dependent on the conditions for loading data at the D inputs and the operation to be performed. The functional clock input of SRL(i+2) is connected to receive the C' clock. The I input of the latch L1 of SRL(i) could be connected directly to the L2 latch of SRL(i−1). Normally, the I input to SRL(i) will be taken from that latch. However, if a DEBUG control signal is active, a multiplexer switch 44 will select data from a feedback path from the output 30o of the scan chain 30.

The operation of the various circuit elements mentioned above will become clear from the descriptions of the task save and restore operations set forth below. In general terms, the control circuitry 12, by generating TSRMODE and TSRSTEP signals, causes the LSSD clock generator 14 to change the clocking of the SRLs in the processor circuitry 11 only, from functional mode C'—B' clocking to scan mode A'—B' clocking, whereby data in the SRLs in the processor circuitry may be clocked along those portions of the scan chains. The SRLs in the other portions of the scan chains are operated in the normal functional mode, with conventional C—B clocking. Illustrations of the operation of this example of the invention are set out below for a Task Save operation, a Task Restore operation and a Combined Task Save and Restore operation.

Task Save Operation—An Example

Figure 6A:
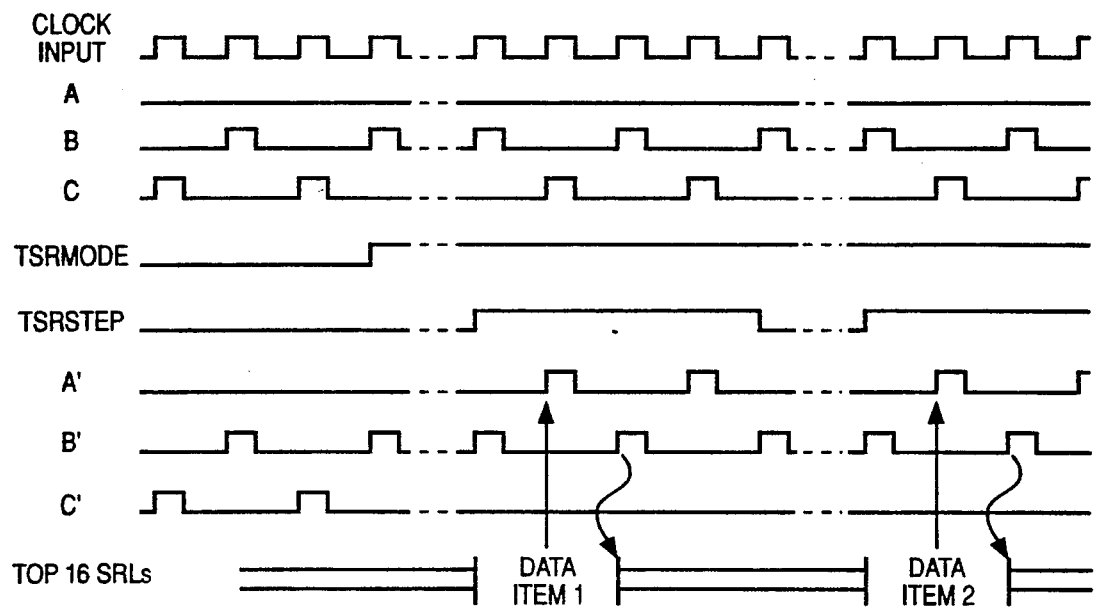
FIG. 6 are signal waveforms of a Task Save operation in the processor of FIGS. 2 and 3.
Figure 6B:
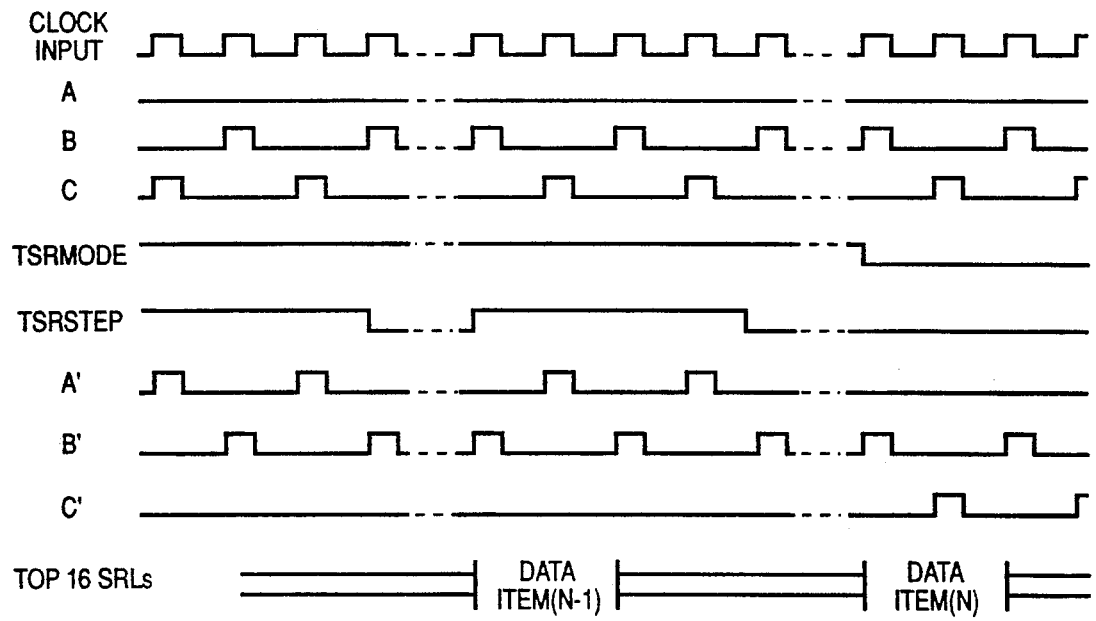

A Task Save operation as performed in the processor of FIGS. 2 and 3 is described in the following with reference to FIGS. 4 and 6. A Task Save operation will normally be initiated by a Task Save instruction from the main system processor (not shown), which will be received over the main system bus 25 by the external interface circuitry 13. This instruction is passed via lines 18 to the control circuitry 12, which activates a control signal (TSRMODE) to the clock 14. In response to this control signal, the clock generator 14 disables all C' clocks to the SRLs in the processor circuitry 11, which causes all functional processing in the processor circuitry to cease. The current task of the processor 10 is thereby stopped and the current state of the processor is held in the SRLs of the processor circuitry 11. The clock generator 14 continues to send B' clocks to the processor circuitry 11. In the absence of other clocks to the SRLs, the B' clocks merely mean that the state of the first latch in an SRL latch pair is read into the second latch of the pair, but as the state of the first latch is not changing, no changes of state occur.

The contents from the last SRLs 41 of the scan chains in the processor circuitry 11 are read out via bus 40 and are stored in memory. If, as in the present case, the processor 10 is a coprocessor linked to a main system processor and the main system memory via the bus 25, then the data read out from the SRLs may be sent via the bus to the main memory for storage.

The control circuitry 12 then activates another control signal (TSRSTEP) to the clock generator 14. In response to this control signal, the clock generator 14 activates the A' clocks to the processor circuitry 11. The A' clocks to the processor circuitry 11 are interspersed between the B' clocks. This causes the contents of the SRLs in the processor circuitry 11 to be stepped down through the scan chains 30–37, each A'—B' clock pair causing a single step. The TSRSTEP control signal is held active for the number of clock cycles required to step sufficient data through the scan chains. For example, if, as here, there are 8 scan chains and the task is saved as 16-bit data, then the TSRSTEP signal is held active for 2 clock cycles. The control circuitry 12 then deactivates the TSRSTEP control signal. The SRLs 41 at the bottom of the processor circuitry 11 scan chains now contain the data previously in the SRLs immediately above them in the scan chains. The contents of the SRLs 41 at the bottom of the processor core scan chains are read and may be saved in memory as described above.

The Task Save operation continues with repetitive activation of the TSRSTEP control signal. The task being saved flows down through the scan chains 30-37 to the SRLs 41 at the bottom of the processor circuitry 11. After each TSRSTEP signal, the data in the SRLs 41 at the bottom of the processor circuitry 11 is read and saved in memory. The Task Save operation continues until the entire contents of the SRLs in the processor circuitry 11 have been read and saved in memory. The saved task data can be used as the data input in a subsequent Task Restore operation, which will cause the processor 11 to restart the task from the point at which that task was saved. Additionally, the saved task data can be analyzed for diagnostic purposes.

During the Task Save operation, the task that is being saved could be restored at the same time by loading data from the outputs 30o to 37o back into the first SRLs (SRL(i)) of the scan chains 30–37 in the processor circuitry 11. This can be done by the provision of a control signal (DEBUG) from the control circuitry 12 to the multiplexer switch 44 for selecting the feedback path from the end of the scan chain (i.e., in FIG. 5, from the end 30o of the scan chain 30). This is very useful for debugging user software for running on the logic circuitry, as it allows simple dumps of the processor status to be saved at appropriate points in program execution and the restoration of the same task allowing it to continue.

As an alternative, or in addition, a multiplexer could be provided for injecting a reset or predefined restart state (e.g., all zeros) for the processor 10 behind the data being scanned out to memory, on each shift of that data.

It will be appreciated that the operations above are repetitive in nature and are initiated by a single instruction from the main system processor. The data which is stored in memory from the SRLs is ideally stored in consecutive locations in memory so that it may be reliably returned to the processor 10 to restore the processor task at a subsequent time. In view of these aspects, the Task Save instruction preferably takes the form of a string instruction from the main system processor. Such instructions, which are well known in the art and need not be discussed further here, are very efficient as a single instruction is needed to initiate the task, the successive words of data supplied over the data bus being stored in successive memory locations in main system memory.

At the end of the Task Save operation, the control circuitry 12 deactivates the TSRMODE control signal and the processor 10 restarts at the reset or predetermined restart state. Alternatively, at the end of the Task Save operation, a Task Restore operation may be started immediately to load a new task into the processor circuitry 11. In this case, the control circuitry 12 maintains the TSRMODE control signal at the active level and begins the Task Restore operation to load a new task into the processor circuitry 11.

Task Restore Operation—An Example

Figure 7A:
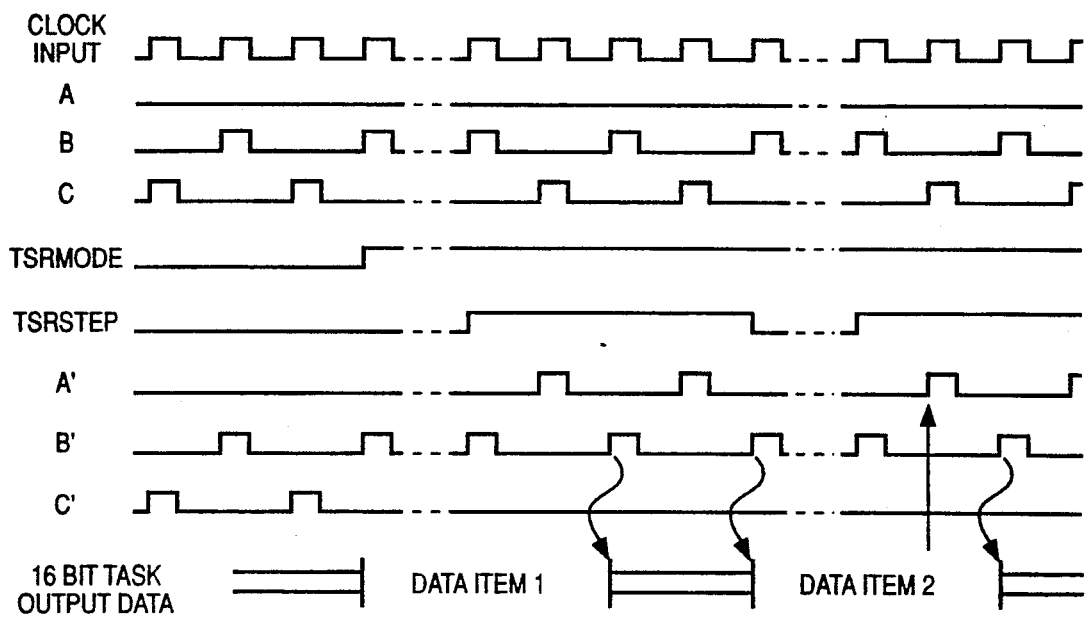
FIG. 7 are a signal waveforms of a Task Restore operation in the processor of FIGS. 2 and 3.
Figure 7B:
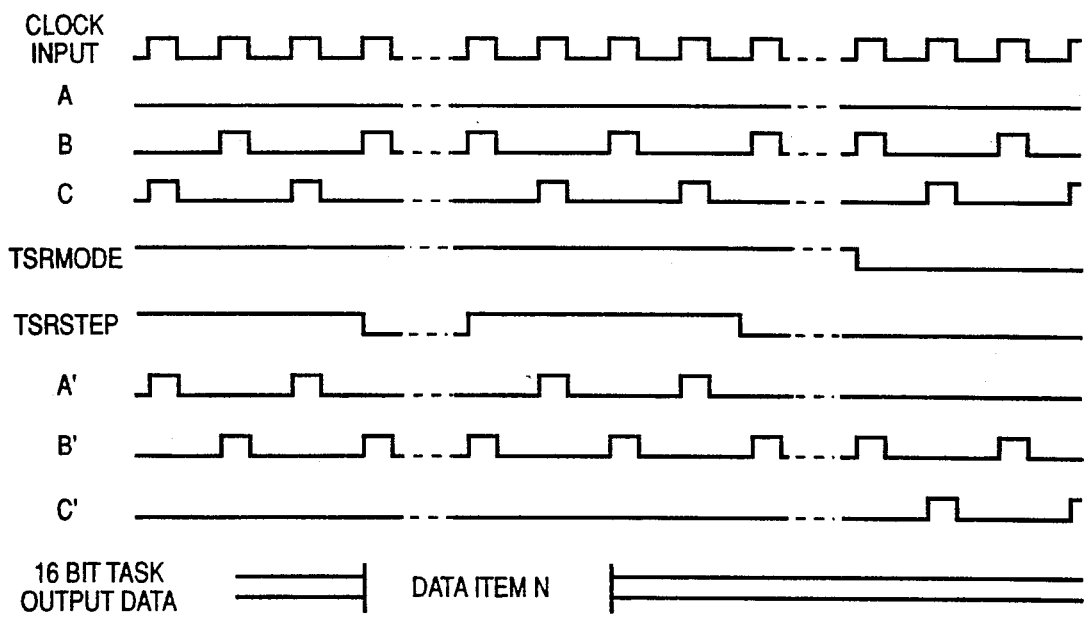

A Task Restore operation as performed in the processor 10 of FIGS. 2 and 3 is described in the following with reference to FIGS. 5 and 7. A Task Restore operation will normally be initiated by a Task Restore instruction from the main system processor (not shown) received by the external interface circuitry 13. This instruction is passed via lines 18 to the control circuitry 12, which activates a control signal (TSRMODE) to the clock generator 14. In response to this control signal, the clock generator 14 disables all C' clocks to the SRLs in the processor circuitry 11, which causes all operations in the processor circuitry to cease. The clock generator 14 continues to send B' clocks to the processor circuitry 11 as in the Task Save operation described above.

The Task Restore operation begins by loading the SRLs 39 at the top of the processor circuitry 11 with the first item of data from data path 38 for the new task using the gated C clocks. The control circuitry 12 then activates another control signal (TSRSTEP) to the clock generator 14. In response to this control signal, the gated C clocks are disabled and the clock generator 14 activates the LSSD A' clocks to the processor circuitry 11. The A' clocks to the processor circuitry 11 are interspersed between the B' clocks. This causes the contents of the SRLs in the processor circuitry 11 to be stepped down through the scan chains 30-37, each A'—B' clock pair causing a single step. The TSRSTEP control signal is held active for the number of clock cycles required to step sufficient data through the scan chains. For example, if, as here, there are 8 scan chains and task is loaded as 16-bit data, then the TSRSTEP is held active for 2 clock cycles. The control circuitry 12 then deactivates the TSRSTEP control signal. The first item of data for the new task, previously loaded into the SRLs 39 at the top of the scan chains in the processor circuitry 11, has been scanned into the SRLs immediately below them in the scan chains. The next item of data for the new task is then loaded into the SRLs 39 at the top of the processor circuitry scan chains. The Task Restore operation continues with repetitive activation of the TSRSTEP control signal. After each TSRSTEP signal, a new item of data for the new task is loaded into the SRLs at the top of the processor circuitry 11 scan chains. The Task Restore operation continues until the new task has completely replaced the old task. The control circuitry 12 then deactivates the TSRMODE control signal and the processor 10 restarts and continues with the new task.

In the arrangement shown in FIG. 5, the data from the bus 38 is gated into the D inputs of SRL(i) and SRL(i+1). As an alternative, however, the SRLs could be arranged such that data is gated in via the I path to those SRLs.

As with the Task Save operation described above, it will be appreciated that the Task Restore operation can be initiated by a single string instruction if the data to be loaded into the SRLs is stored in adjacent memory locations in the correct order.

Combined Task Save and Restore—An Example

If it is desired to take advantage of string instructions, then the preferred manner in which to implement combined task save and restore is to perform a task save instruction followed by a task restore operation.

However, it is also possible to interleave the Task Save and Task Restore operations. The interleaved operation is very similar to the separate operations described above. The repetitive sequence that occurs during TSRMODE active is as follows:

1) Read data from the bottom on SRLs 41 of the processor circuitry 11.
2) Activate TSRSTEP for the required number of clock cycles.
3) Load data into the top SRLs 39 of the processor circuitry 11.

The combined Task Save and Restore operation continues until the new task has completely replaced the old task. The control circuitry then deactivates the TSRMODE control signal and the processor restarts and continues with the new task.

If it is desired to take advantage of string instructions for transferring the data to be inserted into the SRLs from the system memory via the bus 25 and to use an interleaved task save and restore, a temporary buffer memory will need to be provided in the processor 10. With the provision of such a buffer, data to be inserted into the SRLs can be transferred from the system memory using a string instruction before the interleaved task save and restore instruction is performed. This approach means that faster task switching is possible than with the separate task save and task restore operations, but requires the overhead of the additional buffer.

The example of the invention described above enables the saving the current task of an LSSD processor and the loading a new task, using the LSSD scan chains which would conventionally only have been used for circuit testing during manufacture. The task or state of a processor during functional processing is defined by the contents of the SRLs or registers in the processor circuitry. The current task of the processor is saved by stopping the processor and reading the SRLs or registers in the processor circuitry and saving their contents in memory. The new task for the processor is loaded by stopping the processor and loading the SRLs or registers in the processor circuitry with data from an input data stream, the loaded input data stream representing a predefined or previously saved processor task, which is said to be "restored". The task save and restore can be performed by separate task save and task restore operations or by controlled stepping of data through the LSSD scan chains linking the SRLs or registers in the processor circuitry.

Figure 8:
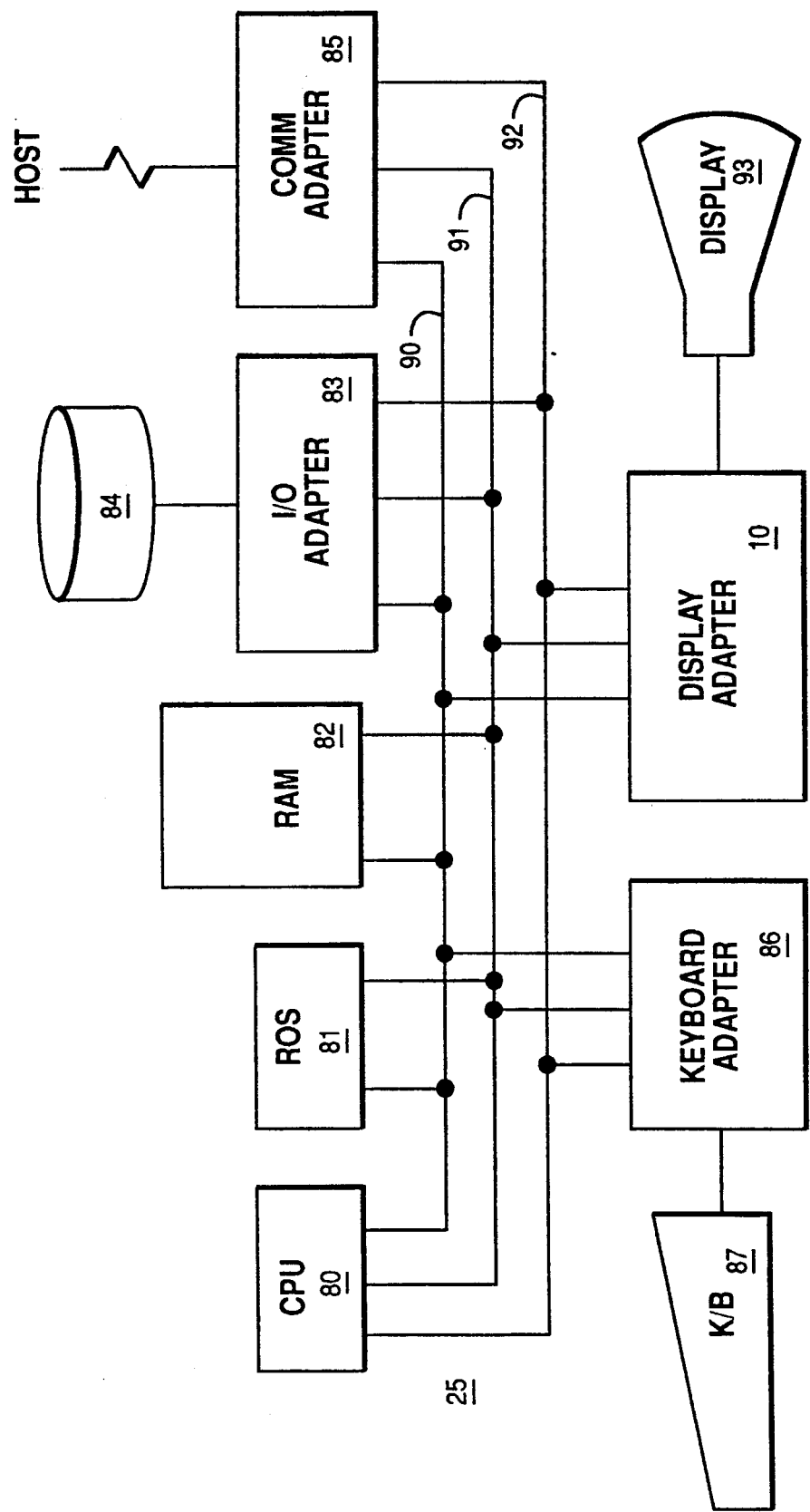
FIG. 8 is a schematic block diagram of a personal computer workstation into which the processor of FIGS. 2 and 3 is incorporated as a display adapter.

The invention is of general applicability to logic circuits suitable for performing tasks in a multiprocessing environment. One class of circuits where it is particularly applicable is for coprocessors and coprocessing logic. FIG. 8 illustrates a possible application for a logic circuit in accordance with the invention in the form of a display adapter 10. FIG. 8 illustrates a personal computer workstation comprising a central processing unit (CPU) 80 in the form of a conventional multitasking processor and a number of other units including the display adapter 10 connected thereto via a system bus 25. The system bus comprises a data bus 90, an address bus 91 and a control bus 92. Connected to the system bus are a random-access memory (RAM) 82 and a read-only store (ROS) 81. An I/O adapter 83 is provided for connecting the system bus 25 to peripheral devices 84 such as disk units. Similarly, a communications adapter 85 is provided for connecting the workstation to external processors (e.g., a host computer). A keyboard 87 is connected to the system bus 25 via a keyboard adapter 86. The display adapter 10 is used for controlling the display of data on a display device 93. In operation the CPU 80 will issue commands to the display adapter 10 over the system bus 25 for causing it to perform display processing tasks. If the processor 80 requires a change in the task being performed, it will issue appropriate task switching instructions over the system bus 25.

It will be appreciated that the invention is not limited to the particular example described above, and that many modifications and additions are possible within the scope of the invention.

Figure 9:
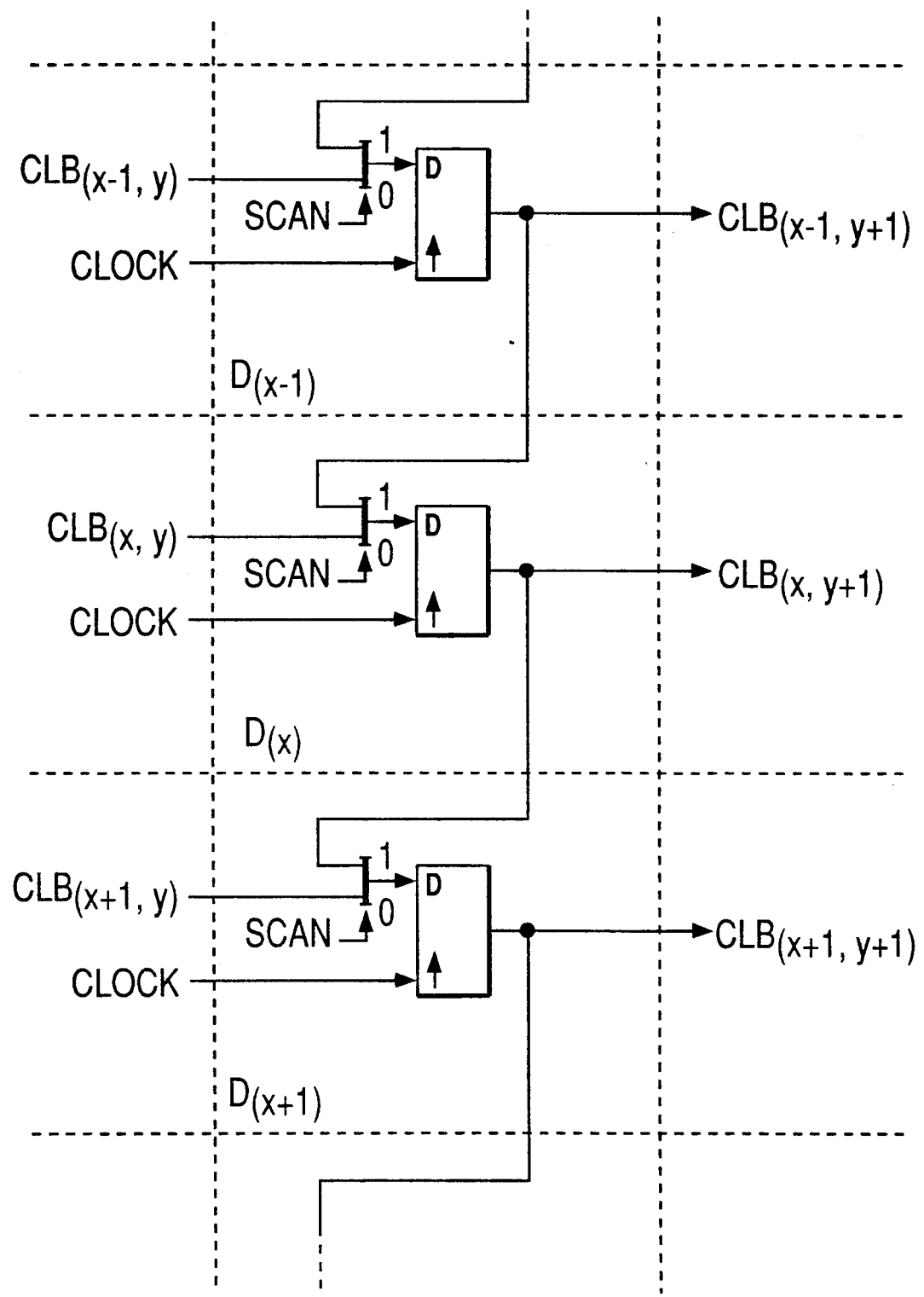
FIG. 9 is a schematic block diagram of a scan chain of an alternative embodiment of the invention in which edge-triggered latches are used.

For example, although the particular example described above is implemented with LSSD technology, the scan chains may be implemented with any appropriate technology. As an example, FIG. 9 illustrates a scan chain formed from edge-triggered D-latches (e.g. D(x)) where a selection is made between latching data from an adjacent block of combinatorial logic CLB(x,y) or from a preceding D-latch D(x−1) by controlling a multiplexer with a scan input "SCAN".

Although, in the particular example described above, 8 scan chains are used and the data width of the data paths 38 and 40 is 16 bits, it will be appreciated that a different number of scan chains and different data widths could have been used.

While the invention has been particularly shown and described with reference to preferred embodiments thereof, it will be understood by those skilled in the art that various changes in form and details may be made therein without departing from the spirit and scope of the invention.

What is claimed is:

1. A logic circuit comprising:
   (a) a plurality of clocked state latches and combinatorial logic for functional processing of a task, each of said state latches supplying an output to and receiving an input from said combinatorial logic, the task being processed by the combinatorial logic in response to functional clocking of the state latches and having a current state defined by said latches, the state latches being additionally interconnected to form at least one scannable chain of latches;
   (b) means for generating a functional clock signal for functional clocking of the state latches and a scan clock signal for scanning the state latches, said functional clock signal being applied to said latches and said scan clock signal being disabled during functional task processing; and
   (c) task switching means which, in response to receipt of a task switch command during functional processing:
      (1) temporarily disables said functional clock signal to interrupt the functional clocking of the state latches, whereby functional task processing is temporarily suspended; and
      (2) during said suspension, causes said scan clock signal to be applied to said state latches to scan each scan chain, whereby existing contents of the state latches defining a task state can be saved from the state latches or new contents defining a task state can be loaded into the state latches.

2. A logic circuit as claimed in claim 1 comprising an input data path for lading data into one or more adjacent state latches at a first position in each scan chain and an output data path for reading data from one or more adjacent state latches at a second position in each scan chain, the remaining state latches of said plurality of state latches being located in each scan chain between said first and second positions.

3. A logic circuit as claimed in claim 2 wherein each scan chain comprises one or more additional clocked latches, not between said first and second positions, which do not define the current state of the task.

4. A logic circuit as claimed in claim 3 wherein the task switching means does not interrupt functional clocking of the additional clocked latches in response to receipt of a task switch command during functional processing, whereby only data for the state latches at and between said first and second positions are saved therefrom or loaded therein.

5. A logic circuit as claimed in claim 2 comprising a processor for processing data wherein the task switching means comprises control circuitry, wherein functional data processing is performed by processor circuity, and wherein each scan chain extends through both said control circuitry and said processor circuitry with said first and second positions corresponding, respectively, to the first and last of said state latches of the scan chains in the processor circuitry.

6. A logic circuit as claimed in claim 2 comprising a plurality of scan chains of latches, each of which scan chains contains the same number of state latches between said first and second positions.

7. A logic circuit as claimed in claim 2 comprising means for selectively loading data from the second position in each scan chain into a state latch at the first position in that scan chain, whereby an existing task position may be restored as its task state data is saved.

8. A logic circuit as claimed in claim 2 in which each scan chain comprises respective pluralities of adjacent state latches at said first and second positions.

9. A logic circuit as claimed in claim 1 comprising an integrated circuit.

10. A logic circuit as claimed in claim 1 wherein the clocking to said latches is level sensitive.

11. In a data processing system comprising a system processor, system memory and a logic circuit as claimed in claim 1, a method of saving a task being performed by said logic circuit in response to receipt of a task save instruction from the system processor, the method comprising the steps of:
a) interrupting the functional clocking of said state latches;
b) reading data from each scan chain at a state latch or a plurality of adjacent state latches at the end of a sequence of said latches in which data defining the functional state of the task is latched and saving said data in said system memory;
c) controlling the state latches to cause data to be scanned along each scan chain by a number of latch positions equal to the number of state latches per scan chain from which data is read in step (b); and
d) repeating steps (b) and (c) until the contents of all of the state latches in said sequence of latches have ben saved in said system memory.

12. In a data processing system comprising a system processor, system memory and a logic circuit as claimed in claim 1, a method of loading a predefined or previously saved task to be performed by said logic circuit in response to receipt of a task restore instruction from the system processor, the method comprising the steps of:
a) interrupting the functional clocking of said state latches;
b) loading data for defining the functional state of the task from system memory into each scan chain at a predetermined number of adjacent state latches at one end of sequence of said latches in which data defining said functional state is to be latched;
c) controlling the state latches to cause data to be scanned along each scan chain by said predetermined number of latch positions;
d) repeating steps (b) and (c) until all of the state latches in said sequence of latches have been loaded with said data from said system memory; and then
e) restoring functional clocking of the state latches.

13. In a data processing system comprising a system processor, system memory, and a logic circuit as claimed in claim 1, a method of saving a first task being performed by the logic circuit and restoring a predefined or previously saved second task to be performed by said logic circuit in response to receipt of a task save-and-restore instruction from the system processor, the method comprising the steps of:
i) initially performing the following steps for saving the first task;
a) interrupting the functional clocking of said state latches;
b) reading data from each scan chain at a predetermined number of adjacent state latches at one end of a sequence of said latches in which data defining the functional state of the first task is latched and saving data in said system memory;
c) controlling the state latches to cause data to be scanned along each scan chain by said predetermined number of latch positions; and
d) repeating steps (i) (b) and (i) (c) until the data from all of the state latches in said sequence of latches has been saved in said system memory; and
(ii) subsequently performing the following steps for restoring the predefined or previously saved task:
a) loading data for defining the functional state of the predefined or previously saved task from system memory into each scan chain at a predetermined number of adjacent state latches at the other end of said sequence of said latches;
b) controlling the state latches to cause data to be scanned along each scan chain by said predetermined number of latch positions;
c) repeating steps (ii) (a) and (ii) (b) until all of the state latches in said sequence of latches have been loaded with said data from said system memory; and then
d) restoring functional clocking of the state latches.

14. In a data processing system comprising a system processor, system memory, and a logic circuit as claimed in claim 1, a method of saving a first task being performed by the logic circuit and restoring a predefined or previously saved task to be performed by said logic circuit in response to receipt of a task save-and-restore instruction from the system processor, the method comprising the steps of:
a) interrupting the functional clocking of said state latches;
b) reading data from each scan chain at a predetermined number of adjacent state latches at one end of a sequence of said latches in which data defining the functional state of the task is latched and saving said data in said system memory;
c) controlling the state latches to cause data to be scanned along each scan chain by said predetermined number of latch positions;
d) loading data for defining the functional state of a new task from system memory into each scan chain at a state latch or a plurality of adjacent state latches at the other end of a sequence of said latches in which data defining said functional state is to be latched;
e) repeating steps (b), (c) and (d) until the data from all of the state latches in said sequence of latches has been saved and replaced by said new data from said system memory; and then
f) restoring functional clocking of the state latches.

15. In a data processing system comprising a system processor, system memory, and a logic circuit as claimed in claim 1, a method of saving a task being performed by the logic circuit and then reinstating the task in response to a debug instruction from the system processor, the method comprising the steps of:
a) interrupting the functional clocking of said state latches;
b) reading data from each scan chain at a predetermined number of adjacent state latches at one end of a sequence of said latches in which data defining the functional state of the task is latched and saving said data in said system memory;
c) controlling the state latches to cause data to be scanned along each scan chain by said predetermined number of latch positions;
d) feeding back said data defining the functional state of the task from said one end of said sequence of latches in each scan chain to a first state latch at the other end of said sequence of latches;
e) repeating steps (b), (c) and (d) until the data from all of the state latches in said sequence of latches has been saved and then restored in said latches; and then
f) restoring functional clocking of the state latches.

16. In a logic circuit comprising a plurality of clocked state latches and combinatorial logic for functional processing of a task, the task being processed by the combinatorial logic in response to functional clocking of the state latches and having a current state defined by said latches, the state latches being additionally interconnected to form at least one scannable chain of latches, a method of task switching in response to receipt of a task switch command during functional processing, said method including the steps of:

temporarily interrupting the functional clocking of the state latches, whereby functional task processing is temporarily suspended; and causing the state latches of each scan chain to be scanned during said suspension, whereby existing contents of the state latches defining a task state can be saved from the state latched or new contents defining a task state can be loaded into the state latches and wherein data is loaded into a state latch or a plurality of adjacent state latches at a first position in each scan chain along an input data path; data is read from a state latch or a plurality of adjacent state latches at a second position in each scan chain along an output data path, the remaining stat latches being located in each scan chain between said first and said second positions; and each scan chain comprises one or more additional clocked latches, not between said first and second positions, which do not define the current state of the task.

17. A method as claimed in claim 16 wherein the task switching means does not interrupt functional clocking of the additional clocked latches in response to receipt of a task switch command during functional processing, whereby only data for the state latches at and between said first and second positions are saved therefrom or loaded therein.

18. A method of task switching in response to receipt of a task switch command during functional processing in a logic circuit including a plurality of clocked state latches and combinatorial logic for functional processing of a task, each of said state latches supplying an output to and receiving an input from said combinatorial logic, the task being processed by the combinatorial logic in response to functional clocking of the state latches and having a current state defined by said latches, the state latches being additionally interconnected to form at least one scannable chain of latches, said method including the steps of:

generating a functional clock signal for functional clocking of the state latches and a scan clock signal for scanning the state latches, said functional clock signal being applied to said latches and said scan clock signal being disabled during functional task processing;

temporarily disabling said functional clock signal to interrupt the functional clocking of the state latches in response to receipt of a task switch command during functional processing, whereby functional task processing is temporarily suspended; and applying said scan clock signal to said state latches to scan each scan chain during said suspension, whereby existing contents of the state latches defining a task state can be saved from the state latches or new contents defining a task state can be loaded into the state latches.

19. The method of claim 18, wherein data is loaded into one or more adjacent state latches at a first position in each scan chain along an input data path and wherein data is read from one or more adjacent state latches at a second position in each scan chain along an output data path, the remaining state latches being located in each scan chain between said first and said second positions.

* * * * *